(12) United States Patent
Parekh et al.

(10) Patent No.: US 11,343,354 B2
(45) Date of Patent: May 24, 2022

(54) INCREASING USER ENGAGEMENT DURING COMPUTING RESOURCE ALLOCATION QUEUES FOR CLOUD SERVICES

(71) Applicant: NVIDIA Corporation, San Jose, CA (US)

(72) Inventors: Hardik Jagdishbhai Parekh, Maharashtra (IN); Sonakshi Anil Kumar Agrawal, Maharashtra (IN)

(73) Assignee: NVIDIA Corporation, Santa Clara, CA (US)

( * ) Notice: Subject to any disclaimer, the term of this patent is extended or adjusted under 35 U.S.C. 154(b) by 181 days.

(21) Appl. No.: 16/661,307

(22) Filed: Oct. 23, 2019

(65) Prior Publication Data

US 2021/0126984 A1   Apr. 29, 2021

(51) Int. Cl.
| | |
|---|---|
| *A63F 13/77* | (2014.01) |
| *H04N 21/431* | (2011.01) |
| *G06F 9/50* | (2006.01) |
| *H04L 67/60* | (2022.01) |
| *H04L 67/75* | (2022.01) |
| *H04L 29/08* | (2006.01) |
| *H04L 67/14* | (2022.01) |

(52) U.S. Cl.
CPC .............. *H04L 67/32* (2013.01); *A63F 13/77* (2014.09); *G06F 9/5072* (2013.01); *H04L 67/36* (2013.01); *H04N 21/431* (2013.01); H04L 67/14 (2013.01)

(58) Field of Classification Search
CPC ......... H04L 67/32; H04L 67/36; H04L 67/14; A63F 13/77; H04N 21/431; G06F 9/5072

USPC .......................................................... 725/43
See application file for complete search history.

(56) References Cited

U.S. PATENT DOCUMENTS

| | | | |
|---|---|---|---|
| 10,967,274 B1 * | 4/2021 | Schuster | A63F 13/77 |
| 2010/0035589 A1 * | 2/2010 | Wormaid | H04M 1/72445 455/414.1 |
| 2015/0375113 A1 * | 12/2015 | Justice | A63F 13/77 463/42 |
| 2017/0021276 A1 * | 1/2017 | Chyou | A63F 13/35 |
| 2017/0095741 A1 * | 4/2017 | Perry | A63F 13/12 |

(Continued)

FOREIGN PATENT DOCUMENTS

WO    WO-2017116874 A1 *  7/2017  ........... A63F 13/335

*Primary Examiner* — Nathan J Flynn
*Assistant Examiner* — Caroline Somera
(74) *Attorney, Agent, or Firm* — Shook, Hardy & Bacon L.L.P.

(57) ABSTRACT

In various examples, upon receiving an indication from a launcher application that a user desires to engage with a cloud gaming or computing service, and determining that a desired computing resource requested for such engagement is unavailable for allocation, one or more interactive content items may be presented in association with a display of the user's local computing device. User actuation of an interactive content item may cause presentation of an options window. One option may cause presentation of an additional content item in the background so it may be viewed after engagement. Another option may cause display of an additional content item, such as in place of the interactive content item or in a web browser external to the launcher application. This option may also cause cancellation of the user request for the allocation and removal of the user request from a queue.

20 Claims, 7 Drawing Sheets

(56) References Cited

U.S. PATENT DOCUMENTS

| | | | |
|---|---|---|---|
| 2018/0047055 A1* | 2/2018 | DeWitt | H04W 4/024 |
| 2019/0146643 A1* | 5/2019 | Foss | G06F 3/04842 |
| | | | 715/767 |
| 2019/0176037 A1* | 6/2019 | Leung | A63F 13/35 |
| 2019/0321725 A1* | 10/2019 | Zimring | A63F 13/358 |
| 2020/0047067 A1* | 2/2020 | Leung | A63F 13/352 |
| 2020/0206636 A1* | 7/2020 | Schultz | A63F 13/358 |
| 2020/0329005 A1* | 10/2020 | Anerella | G06Q 10/10 |

* cited by examiner

INCREASING USER ENGAGEMENT DURING COMPUTING RESOURCE ALLOCATION QUEUES FOR CLOUD SERVICES

BACKGROUND

Cloud gaming services offer an opportunity for users to engage with software applications (e.g., video games) using remote hardware, typically in the form of computing devices, such as servers, owned and operated by a separate company, e.g., a cloud gaming service provider. Rather than downloading all or a substantial portion of assets required for executing a game or other application onto a user's local computing system (e.g., a personal computer, laptop, or gaming console) and playing it locally, cloud gaming relies on internet streaming to deliver graphical content to a user's gaming and/or display device of choice and to communicate any changes to world models or application states produced from the user's input. In this way, a user's console, television, mobile phone, or computer does not have to rely upon its own internal hardware to render graphics or perform other computations for games and other graphical applications. Consequently, games and applications that the user cannot run locally (e.g., due to system constraints and the like), can be accessed by the user via cloud computing.

While the use of cloud computing services offers enhanced capabilities for many users, in some instances such services may have constraints on the number of users that can be served at one time. To provide these services, a cloud computing service provider may allocate computing resources, such as virtual machines (VMs) (e.g., virtual gaming rigs), to users to perform some of the requisite computing for game sessions. However, there may be a limited amount of computing resources or other limits on which users may be simultaneously served, which can lead to constraints on a user's use of the services. For instance, some cloud gaming services have instituted session time limits such that a single user cannot monopolize or consume an outsize portion of computing resources for more than a specified period of time. By way of another example, some cloud gaming services have instituted a tiered access model for their services. For instance, cloud gaming service providers may provide a first level that users can choose that provides them with priority access to computing resources relative to other users and a second level that users can choose with a different level of cost and priority. Regardless of what constraints a cloud gaming service provider places upon users of its service, there may be times when a user desires to use the computing resources of a cloud gaming service, but such service does not have sufficient computing resources available immediately at the time the user requests engagement.

To address computing resource availability, many cloud gaming services have implemented a queue or wait-list model where, upon determining that a user's request for engagement with the cloud gaming service cannot be fulfilled at the time of the request, the user is placed in a queue (or on a wait-list) while they await computing resource availability. In some instances, users are placed in the queue (or on the wait-list) in the order that their engagement requests are received, subject to any applicable constraints, such as the tiered access model discussed above. Once a user is placed in an access queue, they must wait until computing resources are available as appropriate for their requested usage and corresponding access level.

Conventionally, while a user waits for a computing resource, a cloud gaming service may present an indicator informing the user that s/he is in a queue awaiting an available resource. For instance, an indicator may be presented stating "Waiting in queue . . . " or "Looking for next available rig" (referring to a VM such as a virtual gaming rig). In this way, users are affirmatively informed that they have been placed in the queue and that the service is attempting to allocate an available computing resource. Often, in conjunction with the indicator, a static splash screen image is presented that is related to the game the user has indicated s/he has a desire to play. While the splash screen may indicate that the game is in a process of being launched, as wait times for available resources can at times be extensive (e.g., 20-30 minutes or longer), users may lose interest in the presented static image during their wait. A loss of interest can lead to disengagement with the cloud gaming service altogether. Accordingly, presenting static splash screens—or even a rotating ensemble of splash screens— during periods when users are awaiting available computing resources may be undesirable, particularly when wait times are lengthy.

SUMMARY

Embodiments of the present disclosure relate to engaging users during computing resource allocation wait times, for instance, in cloud gaming services. In contrast to conventional systems, such as those described above, the present disclosure provides a mechanism for maintaining or increasing user engagement with an application (e.g., a game, teleconference/communication application, or content creation software suite/application) service provider while they are awaiting allocation of computing resources (e.g., gaming or computing slots) for an instance of an application.

Upon receiving an indication from a launcher application that a user desires to engage with a cloud gaming or computing service, and determining that a desired computing resource requested for such engagement is unavailable for allocation, one or more interactive content items may be presented in association with a display of the user's local computing device. User actuation of a presented interactive content item may cause presentation of at least one additional content item that is related to the interactive content item. In some embodiments, the user actuation first causes presentation of an options window. One option may cause presentation of the additional content item(s) in the background of the game or application launcher (and/or a game launcher window or queue window). In this way, the additional content item(s) is unobtrusive and may be viewed after the game. Another option may cause the user to be redirected to an online location where the additional content item(s) is presented, such as in place of the interactive content item(s) or in a web browser external to the launcher application. This option may also cause cancellation of the user request for the allocation and removal of the user request from a queue (e.g., where the additional content item(s) is presented in a different application). Various embodiments may present any number of these options, or may automatically implement one or more of these options without presenting them and/or after an amount of time has elapsed since actuation of an interactive content item.

BRIEF DESCRIPTION OF THE DRAWINGS

The present systems and methods for engaging users during computing resource allocation wait times, for instance, in cloud gaming services, are described in detail below with reference to the attached drawing figures, wherein.

DETAILED DESCRIPTION

Figure 1:
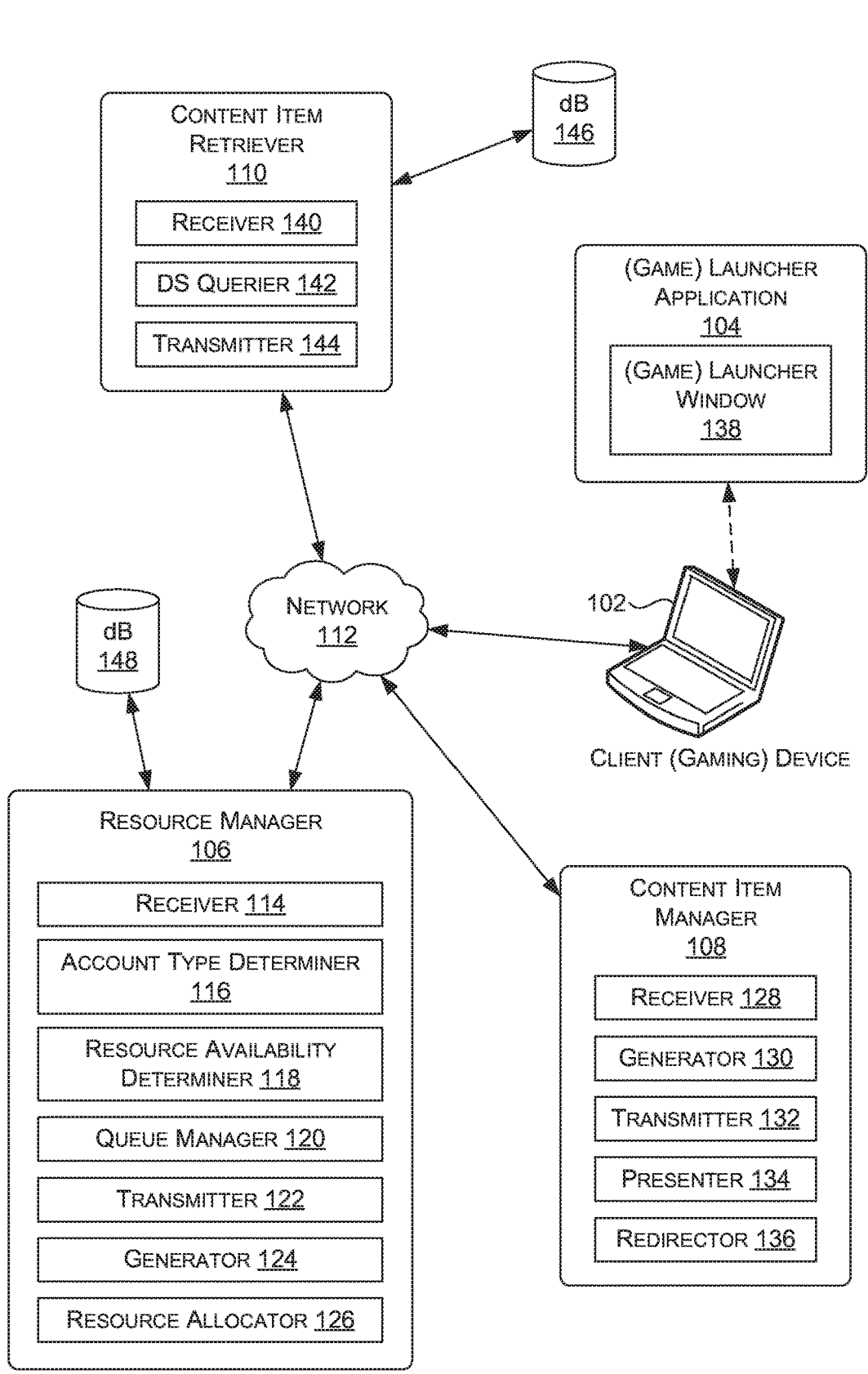
FIG. 1 is a system diagram of an example system for engaging users during computing resource allocation wait times, in accordance with some embodiments of the present disclosure.

Systems and methods are disclosed related to engaging users during computing resource allocation wait times in cloud gaming services. In contrast to conventional systems, the present disclosure provides a mechanism for keeping users engaged with a cloud gaming service while they are awaiting allocation of a user game slot and/or other computing resources for an instance of a game. Disclosed embodiments may not be limited to gaming, and reference to a game and/or computing resources supporting a game may more generally relate to an application and/or computing resources supporting an application, such as, cloud application services, application slots, and the like. Cloud application services may include, by way of example only, enterprise application services (e.g., financial management systems, financial analysis applications, financial control systems, automated billing systems, payment processing systems, email marketing systems, content management systems, customer relationship management systems, enterprise resource planning systems, business intelligence systems, business continuity planning systems, HR management systems, messaging and collaboration systems, and the like) and WebRTC applications. Any and all cloud-based applications for which a limited quantity of computing resources is available at a given time instance such that, upon user request for engagement of such computing resource(s), a wait time may be experienced prior to initiation of such engagement, are contemplated to be within the scope of embodiments of the present disclosure.

Systems and methods are disclosed that may receive, for instance, from a game launcher application, a user request for allocation of at least one computing resource offered by a cloud gaming service provider for an instance of a game application. In embodiments, such computing resources may include, by way of example only, a game slot of a plurality of game slots (and/or one or more Virtual Machines (VMs)) available for allocation by the gaming service provider. As used herein, the term "game slot(s)" may refer to one of a finite number of game instances for which engagement is capable at a particular time. For instance, a particular game may permit one-hundred online players to simultaneously engage with the game. In this instance, each of the one-hundred online players would occupy a single game slot of one-hundred available game slots. Similarly, use of the term "application slot(s)" may refer to one of a finite number of application instances for which engagement is capable at a given time.

Based on the request, the disclosed systems and methods may determine that the requested computing resource(s) is unavailable for allocation at the time the request is received. Based on the resource-unavailability determination, the user request may be placed in a queue (or on a wait-list) of user requests for the requested computing resources (e.g., game slots).

Upon receiving a user request for allocation of a computing resource, and determining that the desired computing resource is unavailable for allocation to the user, one or more interactive content items may be presented, for instance, in association with a display of a computing device that provided the user request. As used herein, the term "interactive content item(s)" may refer to an item of visual content (e.g., an image) actuation of which causes presentation of one or more additional content items related to the actuated content item. In embodiments, the interactive content item(s) may be chosen to entice user engagement via actuation thereof. By way of example, the interactive content item(s) may be related to the game (or other software title) the user has expressed a desire to play or use. For instance, the interactive content item(s) may include one or more selectable images related to an accessory that enhances gameplay of the game the user has expressed a desire to play and actuation (e.g., selection) of the image may cause presentation of information pertaining to acquisition of the accessory. By way of another example, the interactive content item(s) may be related to other applications in which the user might be interested. By way of yet another example, the interactive content item(s) may be based on one or more parameters and/or settings related to gaming system hardware, software, user information (e.g., language, region, etc.), or services. Interactive content items related to any subject, user information, product, or service may be presented within the scope of embodiments of the present technologies.

The interactive content item(s) may be presented in one or more game launcher windows and/or game queue windows of a game launcher application (in a Graphical User Interface (GUI) thereof) of the cloud gaming service. In embodiments, presentation of an indicator informing the user that s/he is in a queue awaiting an available computing resource also may be presented so that the user remains affirmatively informed that resource allocation is still pending. Once a computing resource is available for allocation to the user, presentation of the interactive content item(s) (and the indicator informing the user that s/he is in a queue, if applicable) may cease (e.g., automatically).

Using the technologies described herein, user actuation of a presented interactive content item may cause presentation of at least one additional content item that is related to the interactive content item while the cloud gaming service provider continues to search or wait for an available computing resource (e.g., a virtual gaming rig) to allocate to the user. In accordance with disclosed embodiments, the presentation of the additional content item(s) based on user actuation of an interactive content item, and disclosed approaches for presenting the additional content item(s), improve the ability of computing systems to display information and interact with the user. For example, presentation of the additional content item(s) may maintain user engagement with the cloud gaming service during a wait time. Further options may be presented allowing the user to control how the additional content item(s) is presented and/or a default option may be automatically implemented after a duration. Thus, the user is more likely to be ready to play the game when resources are available, rather than the game remaining idle and wasting computing resources. Further, a user request for an allocation may be canceled in some cases to conserve computing resources.

In some use cases, the additional content item(s) may be presented in a game launcher window and/or game queue window of a game launcher application of the cloud gaming service. In doing so, the game launcher application remains active and in the forefront of the user's desktop or application manager so the user is more likely to be ready when the game launches. In some use cases, one or more of the additional content items may be presented in a window of the game launcher application behind a game launcher window and/or game queue window or otherwise in the background. In doing so, the user may view an additional content item at a later time, such as after the gaming session. In some use cases, the additional content item(s) may be presented in a default web browser associated with a computing device that provided the user request for resource allocation (e.g., the user's gaming computer). The default web browser presenting the additional content item(s) may be positioned in the foreground or the background of the interactive content item(s) and may be available for the user to engage with at any time before, during or after gameplay. In some embodiments, when the computing resource becomes available, a game window may automatically be presented over the additional content item(s) (e.g., in a full screen mode), even where the user is viewing the additional content item(s) in a separate application.

In some embodiments, user actuation of a presented interactive content item may cause presentation of an options window. The options window may include a first option, actuation of which may cause presentation of at least one additional content item in a window of the game launcher application behind the game launcher window and/or game queue window (e.g., in the background of the game launcher application or operating system), such that it is not immediately visible or completely visible to the user without further action. In embodiments, the additional content item(s) may remain in the background (e.g., such that it is positioned behind a gameplay window) once a computing resource is available and allocated and the user is engaged with the cloud gaming service. In this way, the user may view the additional content item(s) (e.g., in a game launcher application) when s/he has ceased gameplay or at any time during gameplay, as permitted by the game the user is playing. Thus, the additional content may still be viewed at a later time without interfering with the game launch or diverting the user's attention from the game. In some embodiments, this option may be automatically executed when the computer resources are allocated to the game and the automatically launched.

In some use cases, the options window may include a second option (in addition to or instead of the first option), actuation of which may cause redirection to an online location where at least one additional content item may be presented within the game launcher application (e.g., in place of the interactive content item(s)) or in a web browser or other application. In some aspects, selection of the second option may also cause cancellation of the user request for computing resources, thus surrendering the user's position in the queue (e.g., where the additional content item(s) is presented in a different application). Thus, based on presenting and/or displaying an additional content item (e.g., in an external application), the user request for computing resources may be automatically canceled and/or the request may be removed from the queue. In doing so, the cloud gaming service may conserve computing resources in cases where the user may be highly engaged in the additional content. Various embodiments may present just the first option, just the second option, or both options. In use cases where a tiered model for resource allocation is available, the options window further may include a third option, actuation of which may facilitate upgrading a user's access tier to reduce or eliminate resource allocation wait times. Any and all such options variations, and any combination thereof, are contemplated to be within the scope of embodiments of the present disclosure.

With reference now to FIG. 1, an example system 100 for engaging users during computing resource allocation wait times is shown, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

The user engagement system 100 includes, among other things, a client device 102 (e.g., a user gaming device), a (game) launcher application 104, a resource manager 106 (e.g., a server), a content item manager 108 (e.g., a server) and a content item retriever 110 (e.g., a server). Although a single client device 102 is illustrated in FIG. 1, this is not intended to be limiting. Any number of client devices 102 may be used within the scope of embodiments of the present disclosure. The user engagement system 100 (and the components and/or features thereof) may be implemented using one or more client devices (e.g., the client device(s) 704 of FIG. 7, more fully described below) and/or server(s) (e.g., the server(s) 702 of FIG. 7, more fully described below). Each of the client device(s) and/or the server(s) may be implemented as one or more of the computing device 800 of FIG. 8, described in more detail below. Similarly, although a single (game) launcher application 104, resource manager 106, content item manager 108, and content item retriever 110 are illustrated in FIG. 1, this too is not intended to be limiting. In any example, there may be any number of (game) launcher applications 104, resource managers 106, content item managers 108 and content item retrievers 110.

Components of the user engagement system 100 may communicate over one or more networks 112. The network(s) 112 may include a wide area network (WAN) (e.g., the Internet, a public switched telephone network (PSTN), etc.), a local area network (LAN) (e.g., Wi-Fi, ZigBee, Z-Wave, Bluetooth, Bluetooth Low Energy (BLE), Ethernet, etc.), a low-power wide-area network (LPWAN) (e.g., LoRaWAN, SigFox, etc.), a global navigation satellite system (GNSS) network (e.g., the Global Positioning System (GPS)), and/or another network type. In any example, each of the components of the user engagement system 100 may communicate with one or more of the other components via one or more of the network(s) 112.

The client device 102 may include a smart phone, a laptop computer, a tablet computer, a desktop computer, a wearable device, a game console, a virtual reality system (e.g., a headset, a computer, a game console, remote(s), controller(s), and/or other components), a streaming device, (e.g., an NVIDIA SHIELD), a smart-home device that may include an intelligent personal assistant, and/or another type of device capable of supporting a cloud-hosted application for which computing resources are to be allocated.

The client device 102 may include the (game) launcher application 104, a display, a communication interface, one or more input device(s), and local storage. Although only a few components and/or features that may be included in the client device 102 are disclosed herein, this is not intended to be limiting. For example, the client device 102 may include additional or alternative components, such as those described below with respect to the computing device 800 of FIG. 8.

The launcher application 104 may be a mobile application, a computer application, a console application, and/or another type of application. The launcher application 104 may include instructions that, when executed by a processor(s), cause the processor(s) to, without limitation, receive input data representative of user inputs to the one or more input device(s), transmit the input data to one or more server(s), retrieve data from memory or local storage, receive data using the communication interface from one or more server(s), and cause presentation of data on the display (e.g., streamed visual data of a rendered game or other application). In other words, the launcher application 104 may operate as a facilitator for enabling engagement with a cloud application on the client device 102.

In some examples, the launcher application 104 may receive display data (e.g., encoded display data, as described with respect to FIG. 7) and use the display data to present a game on a display of the client device 102. In such examples where the display data is received by the client device 102, the user engagement system 100 may be part of a game streaming system, such as the game streaming system 700 of FIG. 7, described in more detail below.

The display of the client device 102 may include any type of display capable of presenting the streamed application (e.g., a light-emitting diode display (LED), an organic LED display (OLED), a liquid crystal display (LCD), an active matrix OLED display (AMOLED), a quantum dot display (QDD), a plasma display, an LED/LCD display, and/or another type of display). In some examples, the display may include more than one display (e.g., a dual-monitor display for computer gaming, a first display for configuring a game and a virtual reality display for playing the game, etc.). In some examples, the display is a touch-screen display, such as a touch-screen of a smart phone, tablet computer, laptop computer, or the like, where the touch-screen is at least one of the input device(s) of the client device 102.

Input device(s) may include any type of devices that are capable of providing user inputs to the game application. The input device(s) may include a keyboard, a mouse, a microphone(s), a touch-screen display, a controller(s), a remote(s), a headset (e.g., sensors of a virtual reality headset), and/or other types of input devices.

The communication interface may include one or more components and features for communicating across one or more networks, such as the network(s) 112. The communication interface may be configured to communicate via any number of network(s) 112, described herein. For example, to communicate in the user engagement system 100 of FIG. 1, the client device 102 may use an Ethernet or Wi-Fi connection through a router to access the Internet in order to communicate with an application server (e.g., a game server), and/or with other client devices 102.

The local storage may include any of a variety of computer-readable media. The computer-readable media may be any available media that can be accessed by the client device 102. The computer-readable media may include both volatile and nonvolatile media, and removable and non-removable media. By way of example, and not limitation, the computer-readable media may comprise computer-storage media and communication media. The local storage may include additional or alternative components, such as those described below with respect to the memory 804 of FIG. 8.

With continued reference to FIG. 1, the (game) launcher application 104 is configured to receive user requests for engagement with one or more games or applications (e.g., from the client device 102) and to transmit requests for computing resources desired for such engagement (e.g., to the resource manager 106). In some embodiments, the (game) launcher application 104 further is configured to present one or more interactive content items in a (game) launcher window 138 thereof, as more fully described below.

The resource manager 106 is configured to receive user requests for allocation of computing resources, determine availability of requested computing resources, and queue user requests and/or allocate computing resources based upon computing resource availability determinations. In this regard, the resource manager 106 includes a receiver 114, an account type determiner 116, a resource availability determiner 118, a queue manager 120, a transmitter 122, a generator 124 and a resource allocator 126. The receiver 114 is configured to receive a user request for allocation of one or more computing resources desired for engagement with a game available from a gaming service provider. In embodiments, the user request may be received from the launcher application 104.

As previously set forth, some cloud gaming services have instituted a tiered access model for their services. For instance, cloud gaming service providers may provide a first level that users can choose that provides them with priority access to computing resources relative to other users and a second level that users can choose with a different level of cost and priority. In such instances, the account type determiner 116 is configured to determine the type of account that the user that requested the computing resource has chosen.

Based upon the user request (and the account type determination, if applicable), the resource availability determiner 118 is configured to determine whether the requested computing resource is available to the user at the time the request is received. Upon determining that the requested computing resource is available for allocation to the user, the requested computing resource may be allocated to the user by the resource allocator 126. Such determination may be made at the time the user request for the desired computing resource is received, or at any time during which the user is awaiting computing resource allocation. When the resources are allocated, the transmitter 122 (and/or a transmitter 132) may transmit data to the launcher application 104, causing the launcher application 104 to automatically present the game or other application on the client device 102. However, upon determining that the requested computing resource(s) is unavailable for allocation to the user, the user request is placed in a queue or on a wait list by the queue manager 120. The queue or wait list may include other user requests for the desired computing resource.

Additionally, upon determining that the requested computing resource is unavailable for allocation to the user at the time the request is received, the transmitter 122 of the resource manager 106 transmits a request for presentation of one or more content items, for instance, in association with a display of the client device 102, during the user's wait time for the desired computing resource. In embodiments, the transmitter 122 transmits the request to the content item manager 108 which is configured to facilitate selection and presentation of one or more interactive content items, as more fully described below.

The desired computing resource may become available for allocation to the user at any time subsequent to receipt of the user request. If the computing resource becomes available subsequent to presentation of one or more interactive content items, the generator 124 is configured to generate a request to cease presentation of the content item(s) and/or launch the game. Such request then may be transmitted (e.g., by the transmitter 122) to the content item manager 108 and/or the launcher application 104 such that cessation of the presentation of the content item(s) may be facilitated and/or presentation of the game for which the computing resources were requested may commence on the client device 102.

The content item manager is configured to receive requests for content items and to facilitate selection and presentation of content items, for instance, in association with the (game) launcher window 138 of the (game) launcher application 104 and/or a display of the client device 102. In this regard, the content item manager 108 includes a receiver 128, a generator 130, the transmitter 132, a presenter 134 and a redirector 136. The receiver 128 is configured to receive requests for presentation of one or more interactive content items (for instance, from the transmitter 122 of the resource manager 106).

As previously set forth, the term "interactive content item(s)" may refer to an item of visual content (e.g., an image, a video, a banner) actuation of which causes presentation of one or more additional content items related to the actuated content item. In embodiments, the content item(s) may be chosen to entice user engagement via actuation thereof. By way of example, the interactive content item(s) may be related to the game the user has expressed a desire to play. For instance, the interactive content item(s) may include one or more selectable images related to an accessory (e.g., a themed game controller or other peripheral device) that enhances gameplay of the game the user has expressed a desire to play and actuation (e.g., selection) of the image may cause presentation of information pertaining to acquisition of the accessory. By way of another example, the interactive content item(s) may be related to other applications in which the user might be interested. By way of yet another example, the interactive content item(s) may be based on one or more parameters and/or settings related to gaming system hardware, software, user information (e.g., language, region, etc.), or services. Interactive content items related to any subject, user information, product, or service may be presented within the scope of embodiments of the present technologies. In this regard, the generator 130 of the content item manager 108 is configured to generate a parameterized request for an interactive content item(s), where applicable.

The transmitter 132 is configured to transmit requests (whether or not parameterized) for interactive content items to the content item retriever 110. The content item retriever 110 is configured to select one or more interactive content items for presentation during a user's wait time for allocation of computing resources. In this regard, the content item retriever 110 includes a receiver 140, a database querier 142 and a transmitter 144.

The receiver 140 of the content item retriever 110 is configured to receive requests (whether or not parameterized) for interactive content items from the transmitter 132 of the content item manager 108. As illustrated, the content item retriever 110 has access to a database 146 (or more generally a datastore). The database querier 142 of the content item retriever 110 is configured to query the database 146 for one or more interactive content items for presentation during the user's computing resource allocation wait time. Once a content item(s) is selected, the transmitter 144 of the content item retriever 110 is configured to transmit the interactive content item(s) to the content item manager 108 where it (or a link to the interactive content item such as a URL) may be received, e.g., by the receiver 128.

The presenter 134 of the content item manager 108 is configured to cause presentation of the received interactive content item(s), for instance, in association with a display of the client device 102 and/or in the (game) launcher window 138 of the (game) launcher application 104. In embodiments, the presenter 134 further may be configured to present an indicator (e.g., in the launcher window 138) informing the user that s/he is in a queue awaiting an available gaming resource so that the user remains affirmatively informed that resource allocation is still pending.

Using the technologies described herein, user actuation of a presented interactive content item may cause presentation of at least one additional content item that is related to the interactive content item while the resource availability determiner 118 continues to look for an available computing resource (e.g., a virtual gaming rig and/or one or more VMs) to allocate to the user. In this regard, the receiver 128 of the content item manager 108 further may be configured to receive indications that a presented interactive content item has been actuated by the user (e.g., from the launcher application 104 and/or the resource manager 106). In response thereto, the transmitter 132 of the content item manager 108 further may be configured to transmit the actuation indication to the content item retriever 110 where it is received by the receiver 140 thereof. The database querier 142 further may be configured to query the database 146 for additional content items related to the actuated content item(s), and the transmitter 144 further may be configured to transmit the additional content item(s) (and/or a link thereto that is used to present the additional content item(s)) to the content item manager 108 for presentation (e.g., by the presenter 134). Additionally or alternatively the additional content item(s) and/or link thereto may be provided by the content item retriever 110 to the content item manager 108 with the interactive content item(s) and/or may be provided to the launcher application 104 with the interactive content item(s). Therefore, separate requests from the interactive content item(s) may not be needed to determine the additional content item(s).

The user engagement system 100 of FIG. 1 may additionally include a database 148 (which, similar to database 146, may more generally be a data store). The database 148 may be configured to be queried for one or more items of data for hosting, running, and/or executing instances of one or more software applications (e.g., application content and/or code), which may be launched using the launcher application 104. In some use cases, the database 148 containing data items for one or more of the software applications and the database 146 containing interactive content items may be separate databases, as shown. In some embodiments, the database 146 may be hosted by a third party such that the interactive content item(s) are provided by the third party. In some use cases, the database 148 and the database 146 may be the same database.

In some use cases, the additional content item(s) may be presented in the game launcher window 138 and/or game queue window (which may be the same as the game launcher window 138) of the game launcher application 104 of the cloud gaming service. In some use cases, the additional content item(s) may be presented in a window of the game launcher application 104 behind the game launcher window 138 and/or game queue window. Such an example use case is illustrated in a screen display 500 of FIG. 5 where the additional content item(s) 502 is presented in a window 504 behind the game launcher window 138. As shown, the game launcher window 138 is displaying the interactive content item(s). In other examples, the additional content item(s) may be displayed in the game launcher window 138 and may replace the interactive content item(s).

In some use cases, the additional content item(s) may be presented in a default web browser associated with a computing device that provided the user request for resource allocation (e.g., the user's gaming computer). The default web browser presenting the additional content item(s) may be positioned in the foreground or the background of the interactive content item(s) and may be available for the user to engage with at any time before, during or after gameplay. For example, the window 504 may be of the web browser or other application that is different than the launcher application. In other examples, the window 504 may be of the launcher application 104. In some embodiments, when the computing resource becomes available, a game window may automatically be presented by the launcher application 104 over the additional content item(s) (e.g., in a full screen mode), even where the user is viewing the additional content item(s) in a separate application.

Figure 5:
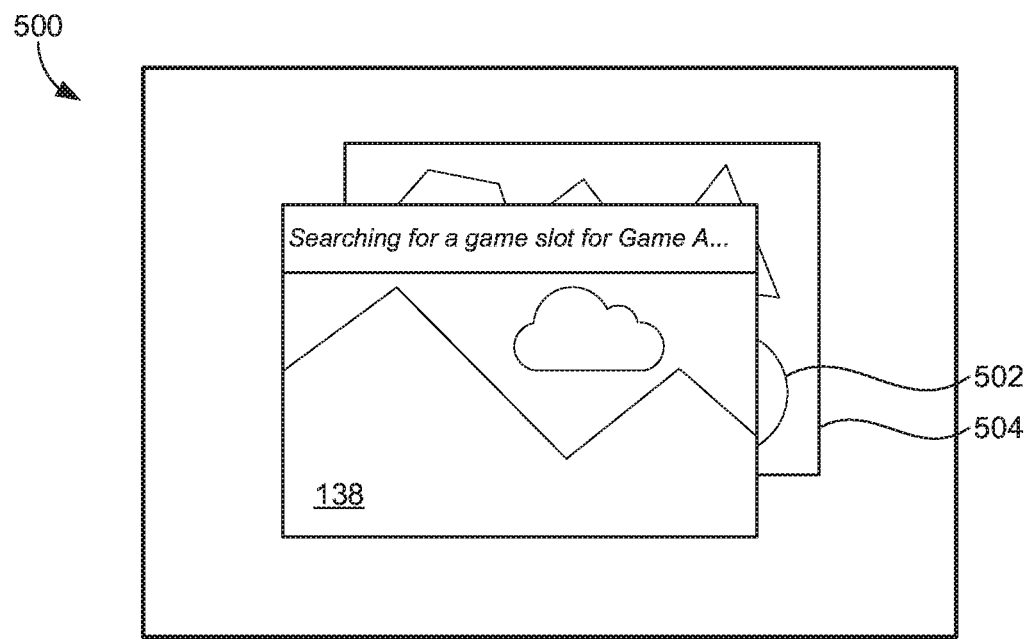
FIG. 5 is a schematic diagram of an example screen display illustrating an additional content item being presented in a window behind a game launcher window, in accordance with some embodiments of the present disclosure.
Figure 6:
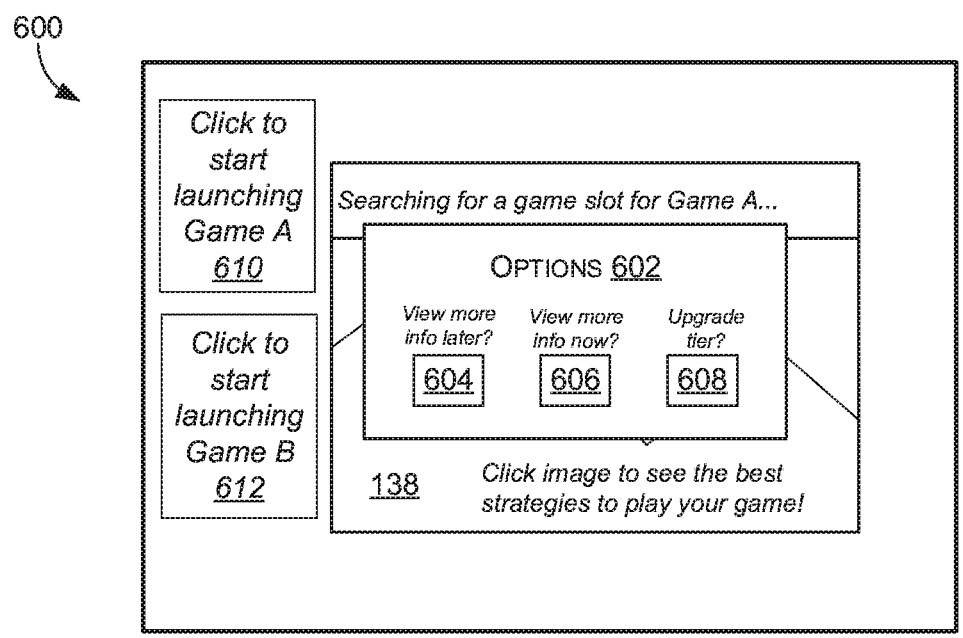
FIG. 6 is a schematic diagram of an example screen display illustrating an options window being presented upon user actuation of a presented interactive content item, in accordance with some embodiments of the present disclosure.

In some embodiments, user actuation of a presented interactive content item may cause presentation of an options window. Such an example embodiment is shown in a screen display 600 of FIG. 6. For example, an option in an options window 602 may be actuated to cause presentation of the screen display 500 of FIG. 5. In some use cases, the options window 602 may include an option 604, actuation of which may cause presentation of at least one additional content item in a window of the game launcher application behind the game launcher window and/or game queue window (for instance, as shown in FIG. 5). In some use cases, the options window 602 may additionally or alternatively include an option 606, actuation of which may cause redirection to an online location (e.g., corresponding to the link or URL) where at least one additional content item may be presented within the game launcher application and/or a web browser. With reference back to FIG. 1, such redirection may be performed and/or facilitated by the redirector 136 of the content item manager 108. In use cases where a tiered model for resource allocation is available, the options window 602 further may include an option 608, actuation of which may facilitate upgrading a user's access tier to reduce or eliminate resource allocation wait times. Any and all such options variations, and any combination thereof, are contemplated to be within the scope of embodiments of the present disclosure.

In some embodiments, if the desired computing resource becomes available prior to the user selecting an option (e.g., 604, 606, or 608) from the options window 602, the disclosed technologies may default to the option 604, allocating the desired computing resource (e.g., a VM and/or virtual gaming rig) to the user and launching the desired game while opening the additional content item(s) in the background, such as in a window behind the game launcher window (as shown in the screen display 500 of FIG. 5), behind a window that presents the game (which may be the launcher window 138 or a different window), and/or behind a main window of the launcher application 104 (which may include a game launcher icon 610 selectable to initiate resource acquisition for one game (and display of the interactive content item if applicable) and a game launcher icon 612 selectable to initiate resource acquisition for another game (and display of the interactive content item if applicable)) where it may remain and be viewable when the user's interaction with the game ceases (e.g., the window that hosts the game is closed) or the user otherwise engages with the additional content item(s) during gameplay.

Figure 2:
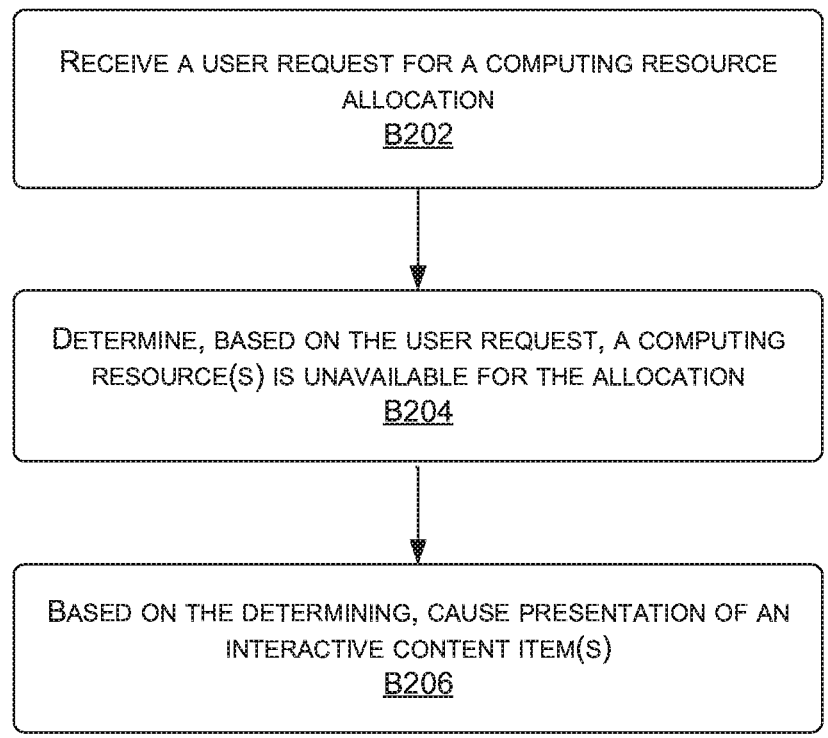
FIG. 2 is a flow diagram showing an example method for engaging users during computing resource allocation wait times, in accordance with some embodiments of the present disclosure.
Figure 3:
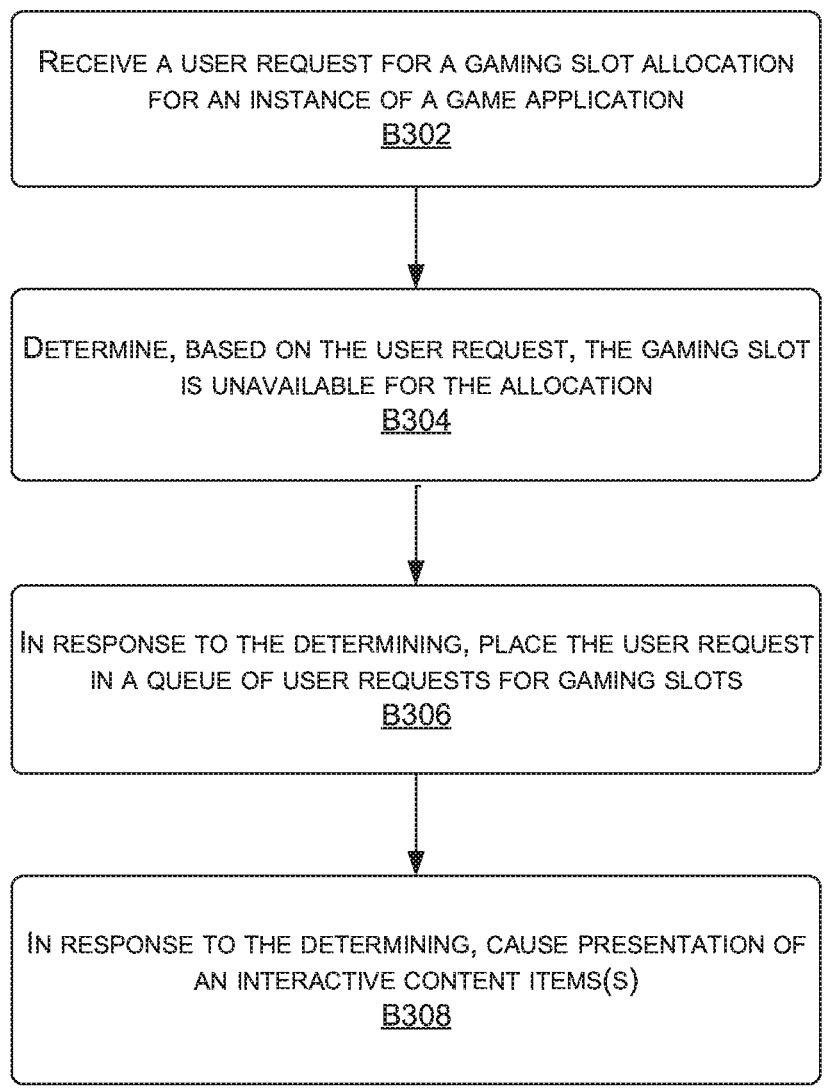
FIG. 3 is a flow diagram showing an example method for engaging users during gaming slot allocation wait times, in accordance with some embodiments of the present disclosure.
Figure 4:
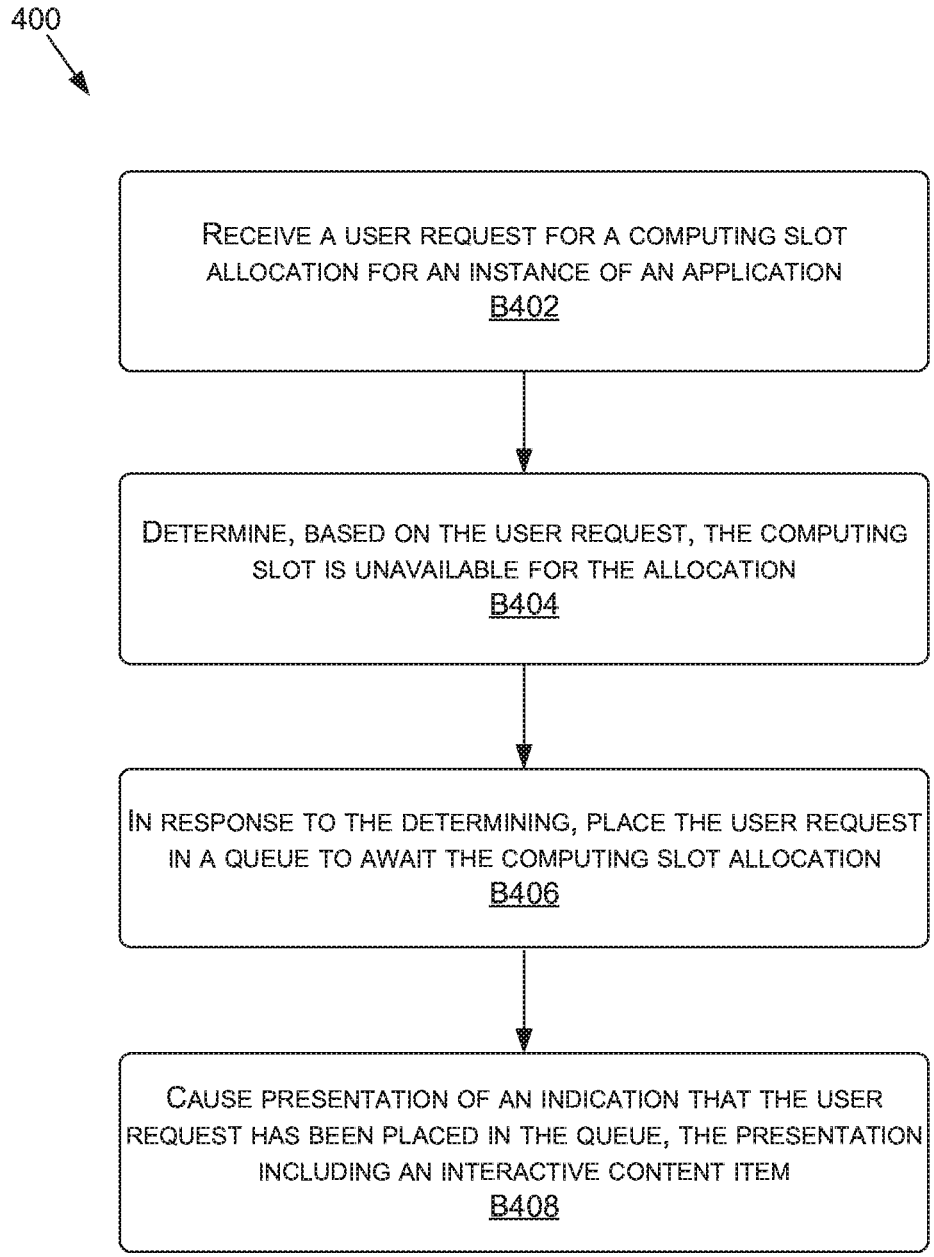
FIG. 4 is a flow diagram showing an example method for engaging users during computing slot allocation wait times, in accordance with some embodiments of the present disclosure.

Turning now to FIGS. 2, 3 and 4, each block of methods 200, 300, and 400, respectively, described herein, comprises a computing process that may be performed using any combination of hardware, firmware, and/or software. For instance, various functions may be carried out by a processor executing instructions stored in memory. The methods also may be embodied as computer-usable instructions stored on computer storage media. Each method may be provided by a standalone application, a service or hosted service (standalone or in combination with another hosted service), or a plug-in to another product, to name a few. In addition, methods 200, 300 and 400 are described, by way of example, with respect to the system of FIG. 1. However, these methods may additionally or alternatively be executed by any one system, or any combination of systems, including, but not limited to, those described herein. For instance, there may be a configuration block that specifies the type of analysis, the type of video processing, and/or other details.

With reference to FIG. 2, a flow diagram is illustrated showing a method 200 for engaging users during computing resource allocation wait times, e.g., for cloud gaming services, in accordance with some embodiments of the present disclosure. The method 200, at block B202, includes receiving, e.g., from a launcher application, a user request for an allocation of at least one computing resource (e.g., a game or application slot) of a cloud application service provider. In some use cases, a user request is received, e.g., from a game launcher application, for an allocation of at least one computing resource of a cloud gaming service provider to an instance of a game application. As previously set forth, the user request for an allocation of at least one computing resource may be received by the receiver 114 of the resource manager 106 of FIG. 1, or by some similar module of a set-top box or other streaming device.

At block B204, the method 200 includes determining, based on the user request, that the requested at least one computing resource is unavailable for the allocation. For example, the computing-resource-unavailability determination may be made, based on the user request, by the resource availability determiner 118 of the resource manager 106 of FIG. 1, or by some similar module of a set-top box or other streaming device.

Block B206 includes, based on the determining that the at least on computing resource is unavailable for the allocation, causing presentation (for instance, in association with a display of a computing device that provided the request for computer resource allocation) of one or more interactive content items. In some use cases, presentation of the interactive content item(s) may be caused in association with a launcher window of a launcher application, for instance, a game launcher window of a game launcher application. As previously set forth, the presentation may be caused by the presenter 134 of the content item manager 108 (or by some similar module of a set-top box or other streaming device) in association with a display of the client device 102 of FIG. 1.

With reference to FIG. 3, a flow diagram is illustrated showing a method 300 for engaging users during game slot allocation in a gaming application, in accordance with some embodiments of the present disclosure. The method 300, at block B302, includes receiving a user request for an allocation of a gaming slot from a plurality of gaming slots of a cloud gaming service provider to an instance of a game application. In some use cases, the user request may be received from a game launcher application. For example, the user request for an allocation of a gaming slot may be received by the receiver 114 of the resource manager 106 of FIG. 1, or by some similar module of a set-top box or other streaming device.

At block B304, the method 300 includes determining, based on the user request, the requested gaming slot is unavailable for allocation. For example, the gaming-slot-unavailability determination may be made, based on the user request, by the resource availability determiner 118 of the resource manager 106 of FIG. 1, or by some similar module of a set-top box or other streaming device.

Block B306 includes, in response to the determining that the gaming slot is unavailable for the allocation, placing the user request in a queue of user requests for gaming slots. For example, the user request for a gaming slot may be placed in a queue of user requests for gaming slots by the queue manager 120 of the resource manager 106 of FIG. 1, or by some similar module of a set-top box or other streaming device.

At block B308, the method 300 includes, in response to the determining that the gaming slot is unavailable for allocation, causing presentation of one or more interactive content items. In some use cases, the presentation of the interactive content item(s) may be caused in a game launcher window of a game launcher application. As previously set forth, the presentation of the interactive content item(s) may be caused by the presenter 134 of the content item manager 108 (or by some similar module of a set-top box or other streaming device) in association with a display of the client device 102 of FIG. 1.

Referring now to FIG. 4, a flow diagram is illustrated showing a method 400 for engaging users during computing slot allocation wait times, in accordance with some embodiments of the present disclosure. The method 400, at block B402, includes receiving a user request for an allocation of a computing slot from a plurality of computing slots of a cloud application hosting service to an instance of an application. In some use cases, the user request may be received from a launcher application. As previously set forth, the user request for an allocation of a computing slot may be received by the receiver 114 of the resource manager 106 of FIG. 1, or by some similar module of a set-top box or other streaming device.

At block B404, the method 400 includes determining, based on the user request, that the computing slot is unavailable for the allocation. For example, the computing-slot-unavailability determination may be made, based on the user request, by the resource availability determiner 118 of the resource manager 106 of FIG. 1, or by some similar module of a set-top box or other streaming device.

Block B406 includes, in response to the determining that the computing slot is unavailable for the allocation, placing the user request in a queue of user requests for computing slots to await the allocation of the computing slot. For example, the user request for a computing slot may be placed in a queue by the queue manager 120 of the resource manager 106 of FIG. 1, or by some similar module of a set-top box or other streaming device.

At block B408, the method 400 includes, in response to the determining, causing presentation of an indication that the user request has been placed in the queue, the presentation comprising one or more interactive content items. For example, the presentation of the indication that the user request has been placed in the queue, and of the interactive content item(s), may be caused by the presenter 134 of the content item manager 108 (or by some similar module of a set-top box or other streaming device) in association with a display of the client device 102 of FIG. 1.

Figure 7:
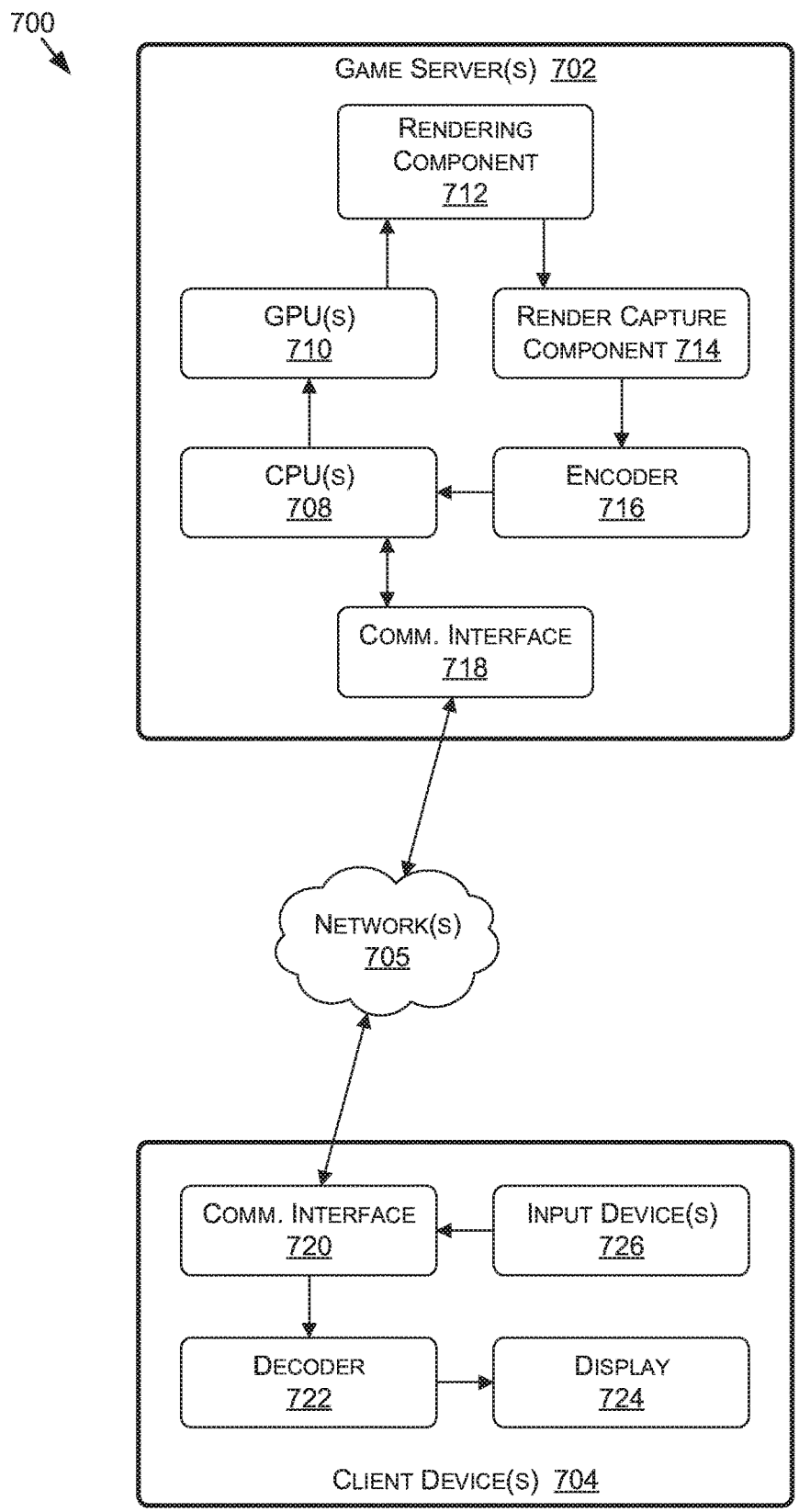
FIG. 7 is an example system diagram for a game streaming system, in accordance with some embodiments of the present disclosure.

Now referring to FIG. 7, an example system diagram for a game streaming system 700 is shown, in accordance with some embodiments of the present disclosure. FIG. 7 includes game server(s) 702 (which may include similar components, features, and/or functionality to the computing device 800 of FIG. 8, more fully described below), client device(s) 704 (which may include similar components, features, and/or functionality to the client device 102 of FIG. 1 and/or the computing device 800 of FIG. 8, more fully described below), and network(s) 806 (which may be similar to the network(s) 112 of FIG. 1). In some embodiments of the present disclosure, the system 700 may be implemented.

In the system 700, for a gameplay session, the client device(s) 704 may only receive input data in response to inputs to the input device(s), transmit the input data to the game server(s) 702, receive encoded display data from the game server(s) 702, and display the display data on the display 724. As such, the more computationally intense computing and processing is offloaded to the game server(s) 702 (e.g., rendering of the gameplay session is executed by the GPU(s) of the game server(s) 702). In other words, the gameplay session is streamed to the client device(s) 704 from the game server(s) 702, thereby reducing the requirements of the client device(s) 704 for graphics processing and rendering.

For example, with respect to an instantiation of a gameplay session, a client device 604 may be displaying a frame of the gameplay session on the display 724 based on receiving the display data from the game server(s) 702. The client device 704 may receive an input to one of the input device(s) 726 and generate input data in response. The client device 704 may transmit the input data to the game server(s) 702 via the communication interface 720 and over the network(s) 706 (e.g., the Internet), and the game server(s) 702 may receive the input data via the communication interface 718. The CPU(s) may receive the input data, process the input data, and transmit data to the GPU(s) that causes the GPU(s) to generate a rendering of the gameplay session. For example, the input data may be representative of a movement of a character of the user in a game, firing a weapon, reloading, passing a ball, turning a vehicle, etc. The rendering component 712 may render the gameplay session (e.g., representative of the result of the input data) and the render capture component 714 may capture the rendering of the gameplay session as display data (e.g., as image data capturing the rendered frame of the gameplay session). The encoder 716 then may encode the display data to generate encoded display data and the encoded display data may be transmitted to the client device 704 over the network(s) 706 via the communication interface 718. The client device 704 may receive the encoded display data via the communication interface 720 and the decoder 722 may decide the encoded display data to generate the display data. The client device 704 then may display the display data via the display 724.

Figure 8:
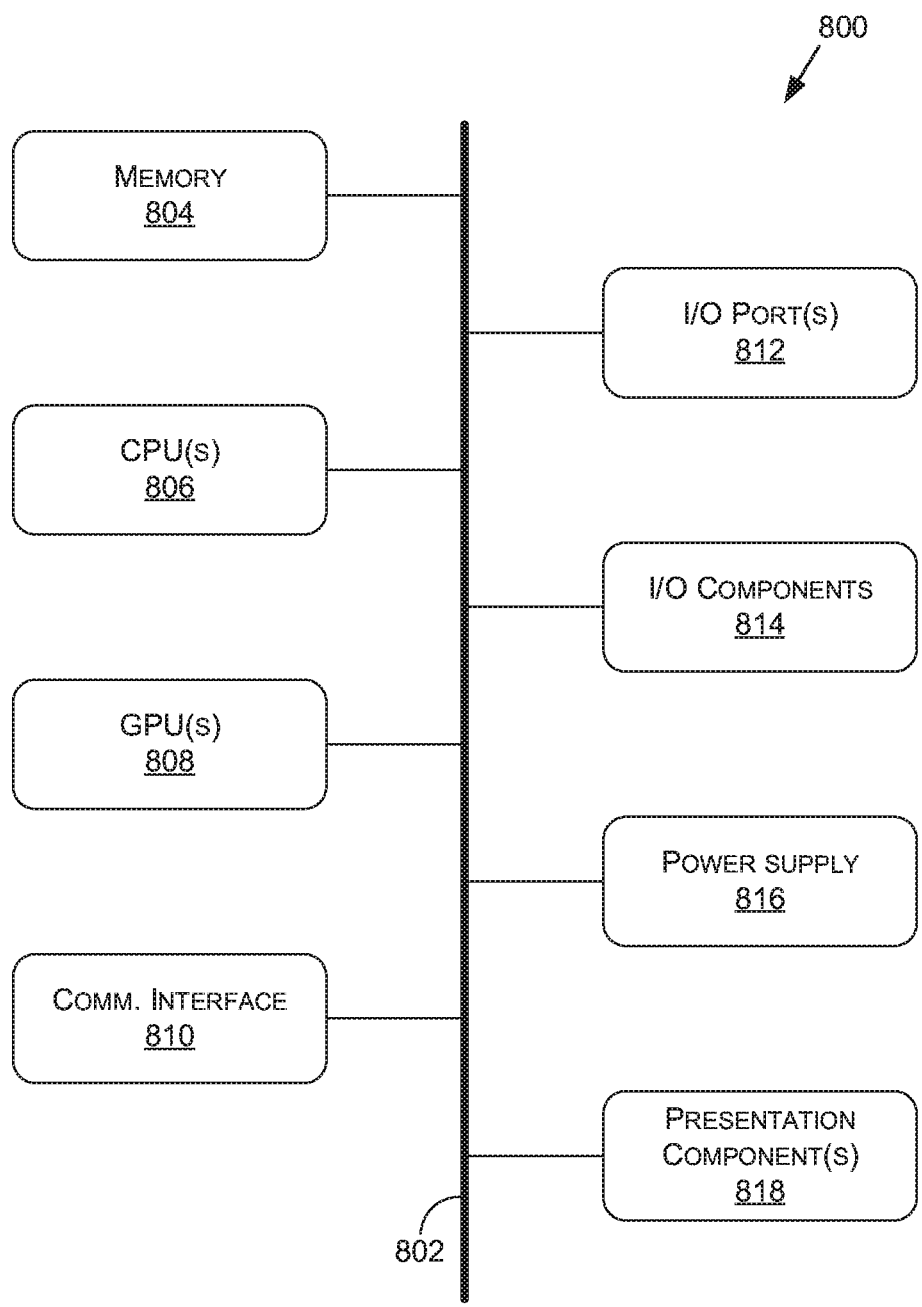
FIG. 8 is a block diagram of an example computing environment suitable for use in implementing some embodiments of the present disclosure

FIG. 8 is a block diagram of an example computing device 800 suitable for use in implementing some embodiments of the present disclosure. The computing device 800 includes a bus 802 that directly or indirectly couples the following devices: a memory 804, one or more central processing units (CPUs) 806, one or more graphics processing units (GPUs) 808, a communication interface 810, input/output (I/O) ports 812, input/output components 814, a power supply 816, and one or more presentation components 818 (e.g., display(s)).

Although the various blocks of FIG. 8 are shown as connected via the bus 802 with lines, this is not intended to be limiting and is for clarity only. For example, in some embodiments, a presentation component 818, such as a display device, may be considered an I/O component 814 (e.g., if the display is a touch screen). As another example, the CPUs 806 and/or GPUs 808 may include memory (e.g., the memory 804 may be representative of a storage device in addition to the memory of the GPUs 808, the CPUs 806, and/or other components). In other words, the computing device of FIG. 8 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 8.

The bus 802 may represent one or more busses, such as an address bus, a data bus, a control bus, or a combination thereof. The bus 802 may include one or more bus types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus.

The memory 804 may include any of a variety of computer-readable media. The computer-readable media may be any available media that may be accessed by the computing device 800. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 804 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 800. As used herein, computer storage media does not comprise signals per se.

The communication media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the communication media may include wired media such as a wired network or direct-wired connection, and wireless media such as acoustic, RF, infrared and other wireless media. Combinations of any of the above should also be included within the scope of computer-readable media.

The CPU(s) 806 may be configured to execute the computer-readable instructions to control one or more components of the computing device 800 to perform one or more of the methods and/or processes described herein. The CPU(s) 806 may each include one or more cores (e.g., one, two, four, eight, twenty-eight, seventy-two, etc.) that are capable of handling a multitude of software threads simultaneously. The CPU(s) 806 may include any type of processor, and may include different types of processors depending on the type of computing device 800 implemented (e.g., processors with fewer cores for mobile devices and processors with more cores for servers). For example, depending on the type of computing device 800, the processor may be an ARM processor implemented using Reduced Instruction Set Computing (RISC) or an x86 processor implemented using Complex Instruction Set Computing (CISC). The computing device 800 may include one or more CPUs 806 in addition to one or more microprocessors or supplementary co-processors, such as math co-processors.

The GPU(s) 808 may be used by the computing device 800 to render graphics (e.g., 3D graphics). The GPU(s) 808 may include hundreds or thousands of cores that are capable of handling hundreds or thousands of software threads simultaneously. The GPU(s) 808 may generate pixel data for output images in response to rendering commands (e.g., rendering commands from the CPU(s) 806 received via a host interface). The GPU(s) 808 may include graphics memory, such as display memory, for storing pixel data. The display memory may be included as part of the memory 804. The GPU(s) 808 may include two or more GPUs operating in parallel (e.g., via a link). When combined together, each GPU 808 may generate pixel data for different portions of an output image or for different output images (e.g., a first GPU for a first image and a second GPU for a second image). Each GPU may include its own memory, or may share memory with other GPUs.

In examples where the computing device 800 does not include the GPU(s) 808, the CPU(s) 806 may be used to render graphics.

The communication interface 810 may include one or more receivers, transmitters, and/or transceivers that enable the computing device 800 to communicate with other computing devices via an electronic communication network, included wired and/or wireless communications. The communication interface 810 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet), low-power wide-area networks (e.g., LoRaWAN, SigFox, etc.), and/or the Internet.

The I/O ports 812 may enable the computing device 800 to be logically coupled to other devices including the I/O components 814, the presentation component(s) 818, and/or other components, some of which may be built in to (e.g., integrated in) the computing device 800. Illustrative I/O components 814 include a microphone, mouse, keyboard, joystick, game pad, game controller, satellite dish, scanner, printer, wireless device, etc. The I/O components 814 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 800. The computing device 800 may be include depth cameras, such as stereoscopic camera systems, infrared camera systems, RGB camera systems, touchscreen technology, and combinations of these, for gesture detection and recognition. Additionally, the computing device 800 may include accelerometers or gyroscopes (e.g., as part of an inertia measurement unit (IMU)) that enable detection of motion. In some examples, the output of the accelerometers or gyroscopes may be used by the computing device 800 to render immersive augmented reality or virtual reality.

The power supply 816 may include a hard-wired power supply, a battery power supply, or a combination thereof. The power supply 816 may provide power to the computing device 800 to enable the components of the computing device 800 to operate.

The presentation component(s) 818 may include a display (e.g., a monitor, a touch screen, a television screen, a heads-up-display (HUD), other display types, or a combination thereof), speakers, and/or other presentation components. The presentation component(s) 818 may receive data from other components (e.g., the GPU(s) 808, the CPU(s) 806, etc.), and output the data (e.g., as an image, video, sound, etc.).

The present disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The present disclosure may be practiced in a variety of system configurations, including hand-held devices, consumer electronics, general-purpose computers, more specialty computing devices, etc. The present disclosure also may be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter also might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A computer-implemented method comprising:
receiving, from a software launcher application, a user request for an allocation of at least one computing resource of a cloud computing service provider to host an instance of a software application, the at least one computing resource to execute the instance of the software application at the cloud computing service provider;
determining that the allocation of the at least one computing resource is temporarily unavailable based on the user request;
based on the determining, causing presentation of one or more interactive content items in a first window of the software launcher application while the at least one computing resource is unavailable to be allocated,
wherein the causing presentation of the one or more interactive content items includes receiving the one or more interactive content items from a first data store comprising a plurality of interactive content items, the first data store being a separate data store from a second data store comprising data for hosting the software application; and
based on the allocation of the at least one computing resource becoming available, causing the instance of the software application to launch at the cloud computing service provider using the at least one computing resource.

2. The computer-implemented method of claim 1, wherein the presentation includes a graphical indication that the user request has been added to a queue of user requests for allocation of the at least one computing resource.

3. The computer-implemented method of claim 1, further comprising:
receiving a user actuation of a content item of the one or more interactive content items; and
in response to the receiving of the user actuation of the content item, causing presentation of a second window displaying an option, wherein actuation of the option causes presentation of at least one additional content item in a window of the software launcher application.

4. The computer-implemented method of claim 1, further comprising:
receiving a first user actuation of a content item of the one or more interactive content items; and
in response to the receiving of the first user actuation of the content item, causing presentation of a second window displaying an option, wherein actuation of the option causes redirection to an online location where at least one additional content item is presented within the software launcher application; and
in response to receiving a second user actuation of the option, cancelling the user request for the allocation and causing presentation of the at least one additional content item within the software launcher application.

5. The computer-implemented method of claim 1, further comprising:
receiving a user actuation of a content item of the one or more interactive content items; and
in response to the receiving of the user actuation of the content item, causing presentation of at least one additional content item in a default web browser of a computing device that provided the user request.

6. The computer-implemented method of claim 1, wherein the user request is generated in response to an actuated option in the software launcher application to launch the instance of the software application.

7. The computer-implemented method of claim 1, further comprising automatically causing presentation of a third window, the third window being associated with the instance of the software application in response to performing the allocation.

8. A computer-implemented method comprising:
receiving, from a game launcher application, a user request for an allocation of a gaming slot from a plurality of gaming slots of a cloud gaming service provider to host an instance of a game application, the gaming slot to execute the instance of the game application at the cloud gaming service provider;
determining that the gaming slot is temporarily unavailable based on the user request;
in response to the determining that the gaming slot is temporarily unavailable:
placing the user request in a queue of user requests for gaming slots; and
causing presentation of one or more interactive content items in a first window of the game launcher application while the gaming slot is unavailable to be allocated,
wherein the causing presentation of the one or more interactive content items includes receiving the one or more interactive content items from a first data store comprising a plurality of interactive content items, the first data store being a separate data store from a second data store comprising data for hosting the game application; and
based on the allocation of the gaming slot becoming available, causing the instance of the software application to launch at the cloud gaming service provider using the gaming slot.

9. The computer-implemented method of claim 8, further comprising:
generating a content item request having one or more parameters associated with the user request;
sending the content item request to a content item server; and
receiving the one or more interactive content items for the presentation in response to the content item request.

10. The computer-implemented method of claim 8, wherein the presentation includes an indication that the user request is in the queue awaiting the allocation of the gaming slot.

11. The computer-implemented method of claim 8, wherein the method further comprises:
receiving a user actuation of a content item of the one or more interactive content items; and
in response to the receiving of the user actuation of the content item, causing presentation of a second window displaying an option, wherein actuation of the option causes presentation of at least one additional content item in a window of the game launcher application.

12. The computer-implemented method of claim 8, wherein the method further comprises:
receiving a user actuation of a content item of the one or more interactive content items; and
in response to the receiving of the user actuation of the content item, causing presentation of a third window displaying an option, wherein actuation of the option causes presentation of the at least one additional content item and a cancellation of the user request for the allocation.

13. The computer-implemented method of claim 8, wherein the user request is generated in response to an actuated option in the game launcher application to launch the instance of the game application.

14. The computer-implemented method of claim 8, further comprising automatically causing presentation of a fourth window, the fourth window being associated with the instance of the game application in response to performing the allocation.

15. A computer-implemented method comprising:
receiving, from a launcher application, a user request for an allocation of a computing slot from a plurality of computing slots of a cloud application hosting service to host an instance of a software application, the computing slot to execute the instance of the software application at the cloud application hosting service;
determining that the computing slot is temporarily unavailable based on the user request;
in response to the determining that the computing slot is temporarily unavailable, placing the user request in a queue to await the allocation of the computing slot;
causing presentation of a graphical indication that the user request has been placed in the queue, the presentation comprising one or more interactive content items; and
based on the allocation of the computing slot becoming available, causing the instance of the software application to launch at the cloud application hosting service using the computing slot.

16. The computer-implemented method of claim 15, further comprising:
in response to a user actuation of the one or more interactive content items, causing presentation of a first window comprising a first option, wherein actuation of the first option causes presentation of at least one additional content item in a background of the launcher application, and a second option, wherein actuation of the second option causes presentation of the at least one additional content item in a foreground of the launcher application and cancellation of the user request for the allocation.

17. The computer-implemented method of claim 15, further comprising:
receiving a user actuation of a content item of the one or more interactive content items; and in response to the receiving of the user actuation of the content item, causing presentation of a first window comprising an option, wherein actuation of the option causes presentation of at least one additional content item in a second window.

18. The computer-implemented method of claim 15, further comprising:
   receiving a user actuation of a content item of the one or more interactive content items; and
   removing the user request from the queue based on the user actuation of the content item.

19. The computer-implemented method of claim 15, further comprising:
   receiving a user actuation of a visual content item of the one or more interactive content items; and
   cancelling the user request based on the user actuation of the visual content item.

20. The computer-implemented method of claim 15, further comprising in response to the allocation of the computing slot, automatically causing the instance of the application to launch and be displayed in association with a computing device that provided the user request.

\* \* \* \* \*